US009185257B2

(12) United States Patent
Furutani et al.

(10) Patent No.: US 9,185,257 B2
(45) Date of Patent: *Nov. 10, 2015

(54) INFORMATION PROCESSING APPARATUS AND METHOD FOR JOB SETTING WITHIN OR OUTSIDE RANGE OF USE AUTHORITY OF USERS

(71) Applicant: KYOCERA Document Solutions Inc., Osaka-shi, Osaka (JP)

(72) Inventors: Hiroshi Furutani, Osaka (JP); Tetsuya Maeda, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,630

(22) Filed: Aug. 27, 2014

(65) Prior Publication Data
US 2015/0062615 A1 Mar. 5, 2015

(30) Foreign Application Priority Data

Aug. 30, 2013 (JP) .................................. 2013-180700

(51) Int. Cl.
*H04N 1/00* (2006.01)
*G06F 21/31* (2013.01)
*G06F 21/41* (2013.01)
*G06F 21/60* (2013.01)
*H04N 1/44* (2006.01)

(52) U.S. Cl.
CPC ............ *H04N 1/00925* (2013.01); *G06F 21/31* (2013.01); *G06F 21/41* (2013.01); *G06F 21/608* (2013.01); *H04N 1/00419* (2013.01); *H04N 1/00952* (2013.01); *H04N 1/4433* (2013.01); *G06F 2221/2117* (2013.01); *G06F 2221/2141* (2013.01); *G06F 2221/2149* (2013.01); *H04N 2201/0094* (2013.01)

(58) Field of Classification Search
None
See application file for complete search history.

(56) References Cited

U.S. PATENT DOCUMENTS

2012/0167201 A1 6/2012 Maeda et al.
2012/0262742 A1* 10/2012 Yano et al. ..................... 358/1.9

FOREIGN PATENT DOCUMENTS

JP 2012137968 A 7/2012

* cited by examiner

*Primary Examiner* — Martin Mushambo
*Assistant Examiner* — Haris Sabah
(74) *Attorney, Agent, or Firm* — Alleman Hall McCoy Russell & Tuttle LLP

(57) ABSTRACT

In an information processing apparatus, if a setting content of a preset second setting item of a plurality of setting items included in pre-registration information selected by a selection portion is outside a range of use authority, a change portion changes the setting content of the second setting item to a content within the range of the use authority. In addition, a sequential display portion sequentially displays a setting screen for setting the setting content of the second setting item, in accordance with a setting operation on the setting screen. Furthermore, a second display control portion displays an authentication screen if the setting content of the second setting item is set on the setting screen so as to be outside the range of the use authority.

8 Claims, 13 Drawing Sheets

| NAME | WORKFLOW 1 | |
|---|---|---|
| TYPE OF JOB | COPY PROCESS | |
| SETTING CONTENT | COLOR SETTING | COLOR |
| | PAPER SETTING | A4 |
| | AGGREGATION SETTING | OFF |
| | ECO-PRINT SETTING | OFF |
| WIZARD DISPLAY | COLOR SETTING | ○ |
| | PAPER SETTING | × |
| | AGGREGATION SETTING | ○ |
| | ECO-PRINT SETTING | × |

| NAME | WORKFLOW 2 | |
|---|---|---|
| TYPE OF JOB | SCAN PROCESS | |
| SETTING CONTENT | COLOR SETTING | COLOR |
| | DOCUMENT SETTING | A4 |
| | FILE FORMAT SETTING | PDF |
| WIZARD DISPLAY | COLOR SETTING | × |
| | DOCUMENT SETTING | × |
| | FILE FORMAT SETTING | ○ |

| PRESENCE/ABSENCE OF JOB PROHIBITION | CONTENT OF JOB PROHIBITION ||||
|---|---|---|---|---|
| | COPY PROCESS | SCAN PROCESS | PRINT PROCESS | FAX TRANSMISSION PROCESS |
| USER A | ABSENCE | | | | |
| USER B | PRESENCE | | | | PROHIBITED |
| USER C | PRESENCE | | | PROHIBITED | PROHIBITED |
| DEFAULT USER | PRESENCE | | PROHIBITED | PROHIBITED | PROHIBITED |

| PRESENCE/ABSENCE OF SETTING PROHIBITION OF COPY PROCESS | CONTENT OF SETTING PROHIBITION OF COPY PROCESS ||||
|---|---|---|---|---|
| | COLOR SETTING | PAPER SETTING | AGGREGATION SETTING | ECO-PRINT SETTING |
| USER A | ABSENCE | | | | |
| USER B | PRESENCE | COLOR PROHIBITED | | | |
| USER C | PRESENCE | | | | OFF PROHIBITED |
| DEFAULT USER | PRESENCE | | A3 PROHIBITED | OFF PROHIBITED | |

INFORMATION PROCESSING APPARATUS AND METHOD FOR JOB SETTING WITHIN OR OUTSIDE RANGE OF USE AUTHORITY OF USERS

INCORPORATION BY REFERENCE

This application is based upon and claims the benefit of priority from the corresponding Japanese Patent Application No. 2013-180700 filed on Aug. 30, 2013, the entire contents of which are incorporated herein by reference.

BACKGROUND

The present disclosure relates to an information processing apparatus that is able to limit a setting content of a job in accordance with a login state of a user; and a job setting method in the information processing apparatus.

An image processing apparatus (an example of an information processing apparatus) that executes various jobs such as a print job or a scan job may have an authentication function to cause a user to log in thereto in accordance with a preset authentication operation. In addition, in such an image processing apparatus, use authority for a setting content of a setting item regarding a job may be changed in accordance with a login state of a user. For example, it is conceivable that, of "color printing" and "monochrome printing" which are setting contents of color type regarding a print job, "color printing" is usable when a user A1 has logged in but cannot be used when a user A2 has logged in.

Meanwhile, as a method for reducing time and effort for a setting operation of setting each setting item regarding a job, there is a method in which a setting content of each setting item is pre-registerable, and the setting content of each setting item is set at once in accordance with a selection operation of selecting the pre-registered pre-registration information in executing the job. In addition, a method (hereinafter, referred to as "wizard format") is also known in which each setting item is sequentially displayed in an interactive format with a user such that a setting content of each setting item is sequentially settable. Furthermore, there is a setting method (hereinafter, referred to as "workflow function") which is a combination of these setting methods and in which a content of each setting item is set in accordance with selection of pre-registered pre-registration information, and contents of one or more preset setting items of the setting items are changeable in a wizard format.

SUMMARY

An information processing apparatus according to one aspect of the present disclosure includes an authentication control portion, a selection portion, an authority specification portion, a first display control portion, a change portion, a sequential display portion, and a second display control portion. The authentication control portion is configured to cause a user to log in in accordance with a preset authentication operation. The selection portion is configured to select pre-registration information in which a setting content of each setting item regarding a job is pre-registered, in accordance with a preset selection operation. The authority specification portion is configured to specify use authority that is preset so as to correspond to a non-login state and each user, in accordance with a current login state. The first display control portion is configured to display an authentication screen for performing the authentication operation, if a setting content of a preset first setting item of a plurality of the setting items included in the pre-registration information selected by the selection portion is outside a range of the use authority. The change portion is configured to, if a setting content of a preset second setting item of the plurality of the setting items included in the pre-registration information selected by the selection portion is outside the range of the use authority, change the setting content of the second setting item to a content within the range of the use authority. The sequential display portion is configured to sequentially display a setting screen for setting the setting content of the second setting item, in accordance with a setting operation on the setting screen. The second display control portion is configured to display the authentication screen if the setting content of the second setting item is set on the setting screen so as to be outside the range of the use authority.

A job setting method according to another aspect of the present disclosure includes the following first to seventh steps. The first step is a step of causing a user to log in in accordance with a preset authentication operation. The second step is a step of selecting pre-registration information in which a setting content of each setting item regarding a job is pre-registered, in accordance with a preset selection operation. The third step is a step of specifying use authority that is preset so as to correspond to a non-login state and each user, in accordance with a current login state. The fourth step is a step of displaying an authentication screen for performing the authentication operation, if a setting content of a preset first setting item of a plurality of the setting items included in the pre-registration information selected in the second step is outside a range of the use authority. The fifth step is a step of, if a setting content of a preset second setting item of the plurality of the setting items included in the pre-registration information selected in the second step is outside the range of the use authority, changing the setting content of the second setting item to a content within the range of the use authority. The sixth step is a step of sequentially displaying a setting screen for setting the setting content of the second setting item, in accordance with a setting operation on the setting screen. The seventh step is a step of displaying the authentication screen if the setting content of the second setting item is set on the setting screen so as to be outside the range of the use authority.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A and 3B are diagrams showing examples of pre-registration information used in the multifunction peripheral shown in FIG. 1.

FIGS. 4A and 4B are diagrams showing an example of use authority information used in the multifunction peripheral shown in FIG. 1.

DETAILED DESCRIPTION

Hereinafter, embodiments of the present disclosure will be described with reference to the drawings to enable understanding of the present disclosure. It should be noted that the following embodiments are examples embodying the present disclosure, and, by nature, do not limit the technical scope of the present disclosure.

Incidentally, the following problem is conceivable when a workflow function is used in an image processing apparatus in which use authority is changed in accordance with a login state of a user. Specifically, it is conceivable that when pre-registration information selected by the user includes a setting content of a setting item that cannot be used in the current login state, an authentication screen is displayed to prompt the user to log in, in order to make the setting content of the setting item usable. However, in the workflow function, a setting content of a setting item that cannot be used in the current login state may be changed in a wizard format to a setting content that can be used in the current login state. In this case, the problem arises that a login operation of the user on the authentication screen is wasted. In contrast, in a later-described multifunction peripheral 10 according to an embodiment of the present disclosure, it is possible to eliminate the need for a wasted login operation of the user in setting a setting content of each setting item regarding a job by using the workflow function.

[Schematic Configuration of Multifunction Peripheral 10]

Figure 1:
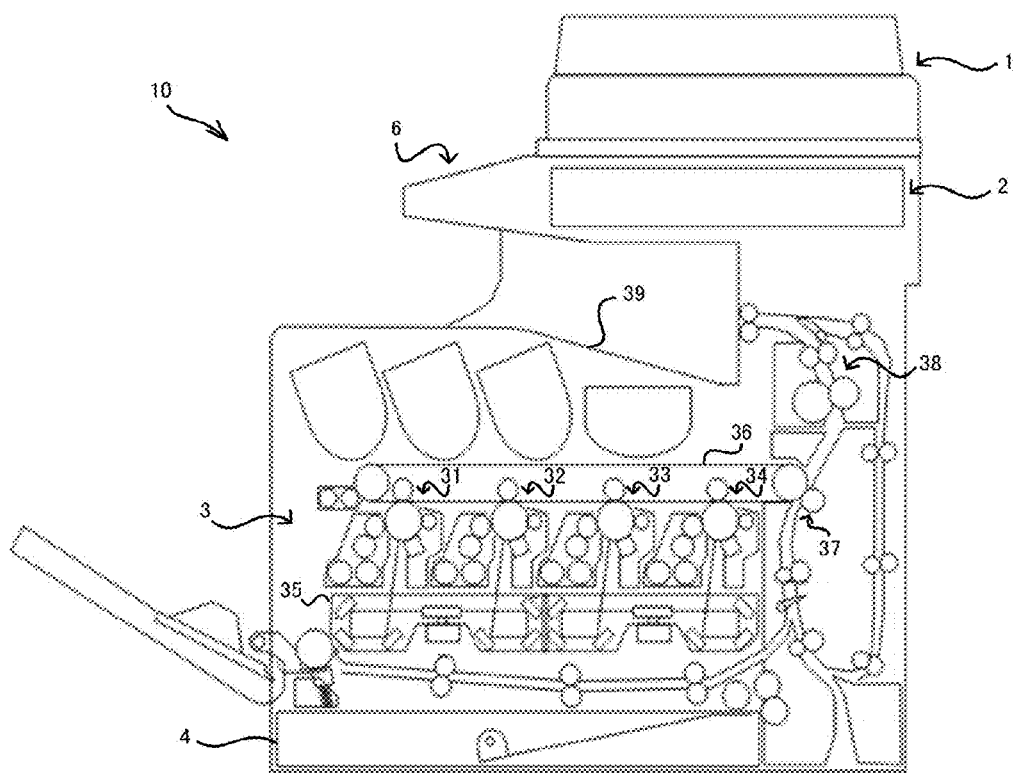
FIG. 1 is a schematic configuration diagram of a multifunction peripheral according to an embodiment of the present disclosure.
Figure 2:
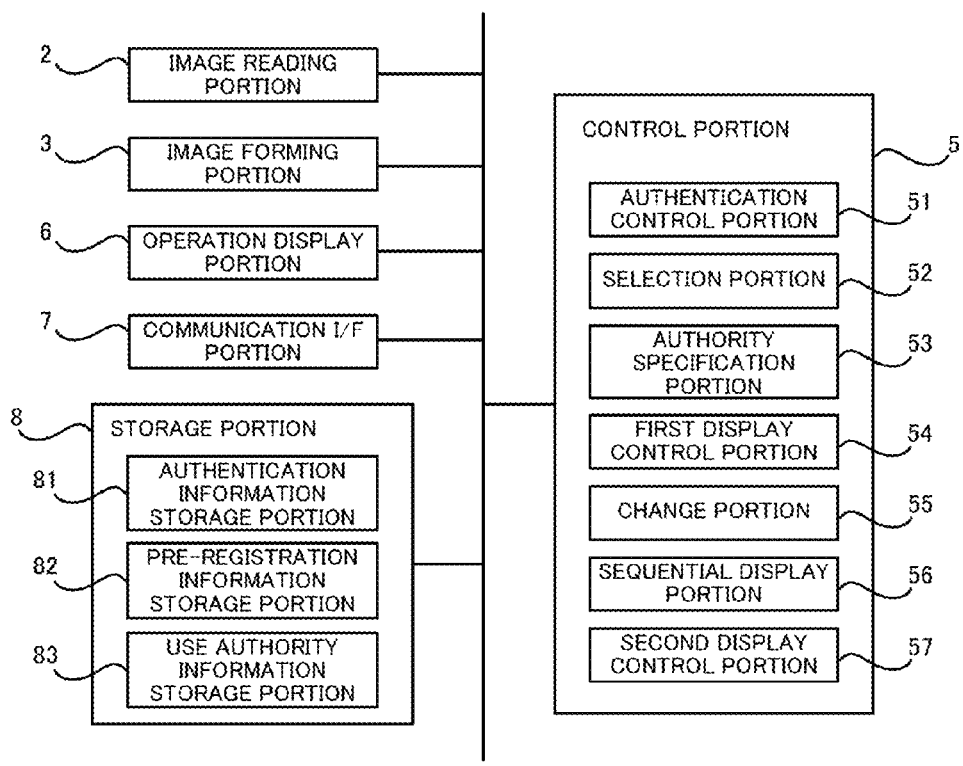
FIG. 2 is a block diagram showing an example of the system configuration of the multifunction peripheral shown in FIG. 1.

First, a schematic configuration of the multifunction peripheral 10 according to the embodiment of the present disclosure will be described with reference to FIGS. 1 and 2. As shown in FIGS. 1 and 2, the multifunction peripheral 10 includes an ADF 1, an image reading portion 2, an image forming portion 3, a sheet feed cassette 4, a control portion 5, an operation display portion 6, a communication I/F portion 7, and a storage portion 8. The multifunction peripheral 10 is able to execute, as a job, each process such as an image reading process of reading image data from a document sheet, an image forming process of forming an image on the basis of image data, or a data transmission process of transmitting image data. It should be noted that the multifunction peripheral 10 is merely an example of an information processing apparatus according to the present disclosure. The present disclosure is also applicable to information processing apparatuses such as a scanner, a printer, a facsimile, a copy machine, a personal computer, a tablet terminal, a smartphone, and a mobile phone.

The ADF 1 is an automatic document feeder that includes a document set portion, a plurality of conveying rollers, a document holder, and a sheet discharge portion which are not shown. In the ADF 1, by each conveying roller being driven by a motor which is not shown, a document sheet placed on the document set portion passes through a reading position at which image data is read by the image reading portion 2, and is conveyed to the sheet discharge portion. Thus, the image reading portion 2 is able to read image data from the document sheet conveyed by the ADF 1.

The image reading portion 2 is an image reading portion that reads image data from a document sheet, and includes a document table, a reading unit, a plurality of mirrors, an optical lens, and a CCD (Charge Coupled Device) which are not shown. The document table is a document placement portion provided on an upper surface of the image reading portion 2. The reading unit applies light to a document sheet at the reading position on the document table. The light reflected on a surface of the document sheet is guided to the optical lens by the plurality of mirrors. The optical lens converges the incident light to cause the light to be incident on the CCD. The CCD includes a photoelectric conversion element that inputs an electrical signal corresponding to an amount of the received light incident from the optical lens, as image data of the document sheet to the control portion 5, and the like.

The image forming portion 3 is an electrophotographic type image forming portion that executes a color or monochrome image forming process (printing process) on the basis of image data read by the image reading portion 2 or image data inputted from an information processing apparatus such as an external personal computer.

Specifically, as shown in FIG. 1, the image forming portion 3 includes a plurality of image forming units 31 to 34, an exposure device (LSU) 35, an intermediate transfer belt 36, a secondary transfer roller 37, a fixing device 38, and a sheet discharge tray 39. The image forming unit 31 is an electrophotographic type image forming unit corresponding to C (cyan), the image forming unit 32 is an electrophotographic type image forming unit corresponding to M (magenta), the image forming unit 33 is an electrophotographic type image forming unit corresponding to Y (yellow), and the image forming unit 34 is an electrophotographic type image forming unit corresponding to K (black). Each of the image forming units 31 to 34 includes a photosensitive drum, a charging device, a developing device, a primary transfer roller, a cleaning device, and the like. The exposure device 35 applies laser light based on image data to each photosensitive drum, thereby forming an electrostatic latent image based on the image data, on each photosensitive drum. Then, the toner image of each color developed on each photosensitive drum by the developing device is intermediately transferred onto the intermediate transfer belt 36, and then is transferred onto a paper sheet supplied from the sheet feed cassette 4, by the secondary transfer roller 37. Then, on the paper sheet onto which each toner image has been transferred, an image is formed by each toner image being melted and fixed by the fixing device 38, and the paper sheet is discharged to the sheet discharge tray 39.

The control portion 5 includes control devices such as a CPU, a ROM, a RAM, and an EEPROM which are not shown. The CPU is a processor that executes various arithmetic processing. The ROM is a nonvolatile storage portion in which information such as control programs for causing the CPU to execute various processing are prestored. The RAM is a volatile storage portion, and the EEPROM is a nonvolatile storage portion. The RAM and the EEPROM are used as temporary storage memories (working areas) for various processing to be executed by the CPU. The control portion 5 performs overall control of the multifunction peripheral 10 by executing various control programs prestored in the ROM by means of the CPU. It should be noted that the control programs may be recorded in a computer-readable recording medium such as a CD, a DVD, or a flash memory, may be read from the recording medium, and may be installed in a storage portion such as the EEPROM of the control portion 5. In addition, the control portion 5 may be composed of an electronic circuit such as an integrated circuit (ASIC). The control portion 5 may be a control portion provided separately from a main control portion that performs overall control of the multifunction peripheral 10.

The operation display portion 6 includes: a display portion such as a liquid crystal display that displays various information in accordance with a control instruction from the control portion 5; and an operation portion such as a hard key or a touch panel that inputs various information to the control portion 5 in accordance with an operation of a user.

The communication I/F portion 7 is a communication interface that connects the multifunction peripheral 10 to a communication network such as the Internet or a LAN and executes data communication via the communication network.

The storage portion 8 is a non-volatile storage portion such as a hard disk or an SSD that stores image data read by the image reading portion 2 or image data inputted from an information processing apparatus such as an external personal computer.

In addition, as shown in FIG. 2, the storage portion 8 includes an authentication information storage portion 81, a pre-registration information storage portion 82, and a use authority information storage portion 83. Each of the authentication information storage portion 81, the pre-registration information storage portion 82, and the use authority information storage portion 83 is a storage area secured within the storage area of the storage portion 8. It should be noted that any one or more of the authentication information storage portion 81, the pre-registration information storage portion 82, and the use authority information storage portion 83 may be storage areas secured in another storage portion such as the EEPROM of the control portion 5.

Authentication information used for causing the user to log in in accordance with a preset authentication operation is stored in the authentication information storage portion 81. Specifically, the authentication information is a user name and a password that are predetermined for each user.

One or more pieces of pre-registration information in which a setting content of each setting item regarding a job is pre-registered are stored in the pre-registration information storage portion 82. In each piece of the pre-registration information, a name that specifies the pre-registration information, the type of the job, the setting content of each setting item regarding the job, and whether each setting item is to be displayed in the wizard format are pre-registered. For example, in the pre-registration information, the contents thereof are pre-registered by the control portion 5 in accordance with an operation input with respect to the operation display portion 6 by the user in initial setting of the multifunction peripheral 10 or the like, and the pre-registration information is stored in the pre-registration information storage portion 82.

Here, FIGS. 3A and 3B show examples of the pre-registration information stored in the pre-registration information storage portion 82. In pre-registration information D10 shown in FIG. 3A, "workflow 1" is registered as the name, and "copy process" is registered as the type of the job. In addition, in the pre-registration information D10, setting contents are registered for "color setting", "paper setting", "aggregation setting", and "eco-print setting", respectively, which are setting items regarding the copy process. Specifically, in the pre-registration information D10, the setting content of the color setting is "color", and the setting content of the paper setting is "A4". In addition, in the pre-registration information D10, the setting content of the aggregation setting is "OFF", and the setting content of the eco-print setting is "OFF".

The aggregation function is a function to print images of a plurality of document sheets on a single paper sheet. As a setting content of the aggregation function, "2 IN 1" in which images of two document sheets are printed on a single paper sheet or "4 IN 1" in which images of four document sheets are printed on a single paper sheet is selectable. In addition, the eco-print function is a function to perform printing with a smaller amount of toner than that when a general copy function is used, thereby saving toner consumption. As a setting content of the eco-print function, "ON" or "OFF" is selectable. It should be noted that as a setting content of the color setting, either "color printing" or "monochrome printing" is selectable. In addition, as a setting content of the paper setting, various paper sheet sizes such as "A3", "A4", and "B5" are selectable.

Furthermore, in the pre-registration information D10, the color setting and the aggregation setting are registered as setting items to be displayed in the wizard format. In other words, when setting of the copy process is performed by the workflow function on the basis of the pre-registration information D10, setting screens for the color setting and the aggregation setting are displayed on the operation display portion 6. Here, in the pre-registration information D10, the color setting and the aggregation setting are examples of a second setting item which is preset as a setting item to be displayed in the wizard format. In addition, in the pre-registration information D10, the paper setting and the eco-print setting are examples of a first setting item which is preset as a setting item not to be displayed in the wizard format.

Similarly, in pre-registration information D11 shown in FIG. 3B, "workflow 2" is registered as the name, and "scan process" is registered as the type of the job. In addition, in the pre-registration information D11, setting contents are registered for "color setting", "document setting", and "file format setting", respectively, which are setting items regarding the scan process. Furthermore, in the pre-registration information D11, the file format setting is preset as the second setting item to be displayed in the wizard format, and each of the color setting and the document setting is preset as the first setting item not to be displayed in the wizard format.

Use authority information representing use authority that is preset so as to correspond to a non-login state and each user is stored in the use authority information storage portion 83. For example, the use authority information is prestored in the use authority information storage portion 83 by the control portion 5 in accordance with an operation input with respect to the operation display portion 6 by a user having administrator authority in initial setting of the multifunction peripheral 10 or the like.

Specifically, the use authority information includes job authority information D20 shown in FIG. 4A and setting authority information D30 shown in FIG. 4B. It should be noted that each blank space in FIGS. 4A and 4B indicates that no prohibited content has been set.

As shown in FIG. 4A, in the job authority information D20, presence/absence of prohibition regarding the type of the job and the content of the prohibition are set for each of a user A, a user B, a user C, and a default user. Examples of the type of the job include "copy process", "scan process", "print process", "data transmission process", "network scan process", and "fax transmission process". It should be noted that the default user is preset as a user in a non-login state where the user has not logged in to the multifunction peripheral 10.

In addition, as shown in FIG. 4B, in the setting authority information D30, presence/absence of prohibition regarding a setting content of each setting item of the copy process and the content of the prohibition are set for each of the user A, the user B, the user C, and the default user. Specifically, examples of the setting item include "color setting", "paper setting", "aggregation setting", and "eco-print setting".

For example, in the setting authority information D30, for the default user, it is set that use of "A3" of the paper setting and "OFF" of the aggregation setting is prohibited. Meanwhile, for the user B, use of "color" of the color setting is prohibited, and for the user C, use of "OFF" of the eco-print setting is prohibited. It should be noted that here, the copy process is described as an example, but the use authority information also includes the setting authority information D30 regarding the other jobs.

In the multifunction peripheral 10, the control portion 5 controls whether to execute each of the jobs by the user and execution conditions of the jobs, on the basis of the pre-registration information, the job authority information D20, and the setting authority information D30.

Specifically, as shown in FIG. 2, the control portion 5 includes an authentication control portion 51, a selection portion 52, an authority specification portion 53, a first display control portion 54, a change portion 55, a sequential display portion 56, and a second display control portion 57. The control portion 5 functions as the authentication control portion 51, the selection portion 52, the authority specification portion 53, the first display control portion 54, the change portion 55, the sequential display portion 56, and the second display control portion 57 by executing the control programs stored in the ROM by means of the CPU.

The authentication control portion 51 executes an authentication process of causing the user to log in in accordance with a preset authentication operation. Specifically, the authentication control portion 51 displays an authentication screen 61 on the operation display portion 6 as necessary. Then, the authentication control portion 51 accepts an input operation of inputting login information with respect to the operation display portion 6 by the user on the authentication screen 61. Here, the input operation is an example of the authentication operation. Thereafter, the authentication control portion 51 determines completion of authentication if the login information inputted from the operation display portion 6 is included in the authentication information, and causes the user to log in to the multifunction peripheral 10. It should be noted that the authentication control portion 51 executes a logout process of causing the user, who has logged in, to log out when a logout operation is performed with respect to the operation display portion 6, when a preset time period has elapsed, or when another user is caused to log in.

Figure 5:
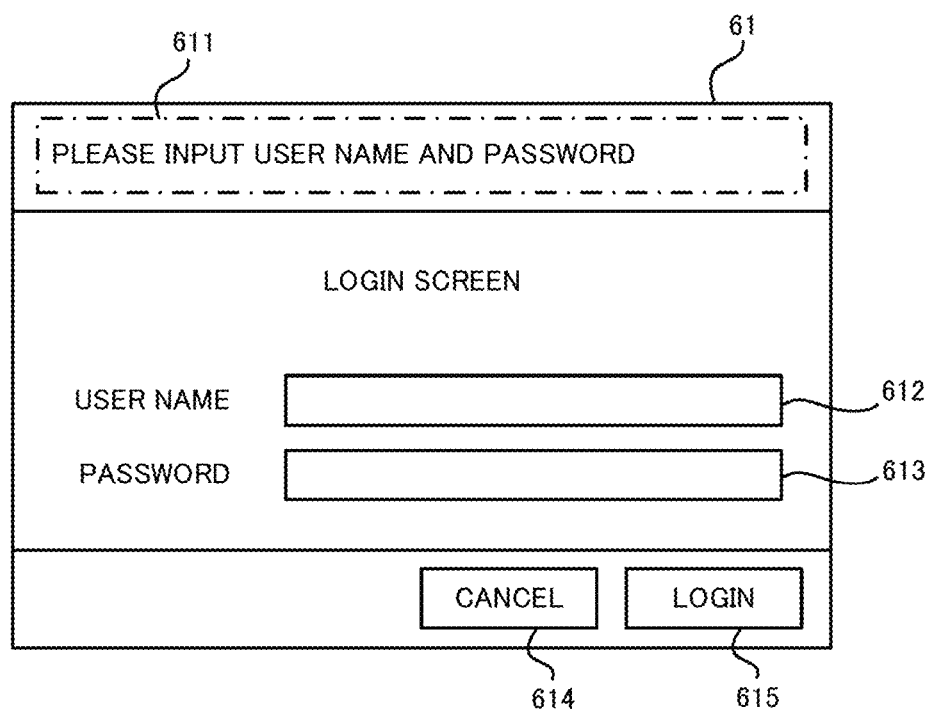
FIG. 5 is a diagram showing an example of an authentication screen displayed on the multifunction peripheral shown in FIG. 1.

Here, FIG. 5 shows an example of the authentication screen 61. On the authentication screen 61 shown in FIG. 5, a message field 611, a user name input field 612, a password input field 613, a cancel key 614, and a login key 615 are displayed. The user is allowed to input a user name and a password each of which is the login information, in the user name input field 612 and the password input field 613 by using the operation display portion 6.

The selection portion 52 selects any of the pre-registration information stored in the pre-registration information storage portion 82, in accordance with a preset selection operation. Specifically, the selection portion 52 displays a workflow selection screen 62 in accordance with an operation of an operation key that is displayed on the operation display portion 6 and used for using the workflow function. Then, the selection portion 52 reads out the selected pre-registration information from the pre-registration information storage portion 82 in accordance with the selection operation by the user on the workflow selection screen 62.

Figure 6:
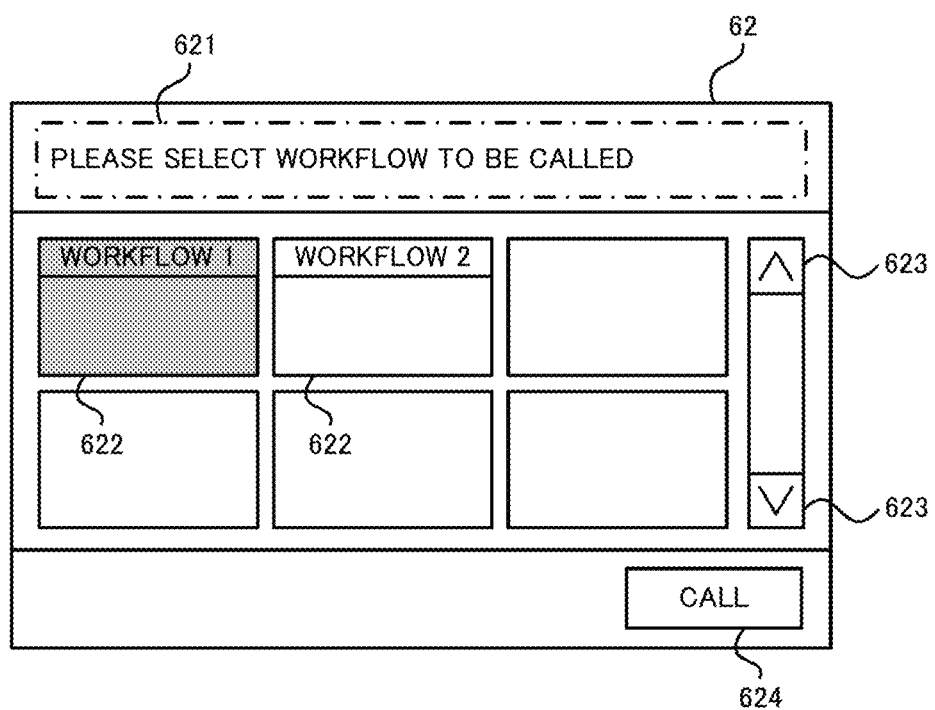
FIG. 6 is a diagram showing an example of a workflow selection screen displayed on the multifunction peripheral shown in FIG. 1.

Here, FIG. 6 shows an example of the workflow selection screen 62. On the workflow selection screen 62 shown in FIG. 6, a message field 621, a plurality of workflow selection keys 622, scroll keys 623, and a call key 624 are displayed. In each workflow selection key 622, the name of each piece of the pre-registration information stored in the pre-registration information storage portion 82 is displayed. A display of the pre-registration information on the workflow selection screen 62 is scrolled up and down in accordance with operations of the scroll keys 623. When any one of the workflow selection keys 622 is operated on the workflow selection screen 62, the pre-registration information corresponding to the operated workflow selection key 622 becomes selected. In addition, the operation display portion 6 displays the operated workflow selection key 622 in a color (e.g., gray) different from the color of the other workflow selection key 622. Then, when the call key 624 is operated in the state where the pre-registration information has been selected, the selection portion 52 reads out the selected pre-registration information from the pre-registration information storage portion 82. Here, the selection of the pre-registration information on the workflow selection screen 62 and the operation of the call key 624 are an example of the selection operation.

The authority specification portion 53 specifies use authority that is preset so as to correspond to a non-login state and each user, in accordance with the current login state. Specifically, the authority specification portion 53 is able to specify use authority of the user who is in a non-login state or has logged in, on the basis of the use authority information stored in the use authority information storage portion 83.

If the setting content of the first setting item of a plurality of the setting items included in the pre-registration information selected by the selection portion 52 is outside the range of the use authority, the first display control portion 54 displays the authentication screen 61 for performing the authentication operation. Specifically, the first display control portion 54 determines whether the setting content of the first setting item is outside the range of the use authority, on the basis of the use authority specified by the authority specification portion 53. It should be noted that the first setting item is a setting item for which a setting screen is not to be displayed in the wizard format.

If the setting content of the second setting item of the plurality of the setting items included in the pre-registration information selected by the selection portion 52 is outside the range of the use authority, the change portion 55 changes the setting content of the second setting item to a content within the range of the use authority. Specifically, the change portion 55 determines whether the setting content of the second setting item is outside the range of the use authority, on the basis of the use authority specified by the authority specification portion 53. It should be noted that the second setting item is a setting item for which a setting screen is to be displayed in the wizard format.

The sequential display portion 56 sequentially displays a setting screen 63 for setting a setting content of each second setting item, in accordance with a setting operation on the setting screen 63. Specifically, the sequential display portion 56 displays the setting screen 63 on the operation display portion 6 in the wizard format which is an interactive format with the user. Then, the sequential display portion 56 sequentially displays the setting screen 63 for the second setting item registered in the pre-registration information selected by the selection portion 52, in accordance with the setting operation of the user on the setting screen 63.

Figure 7A:
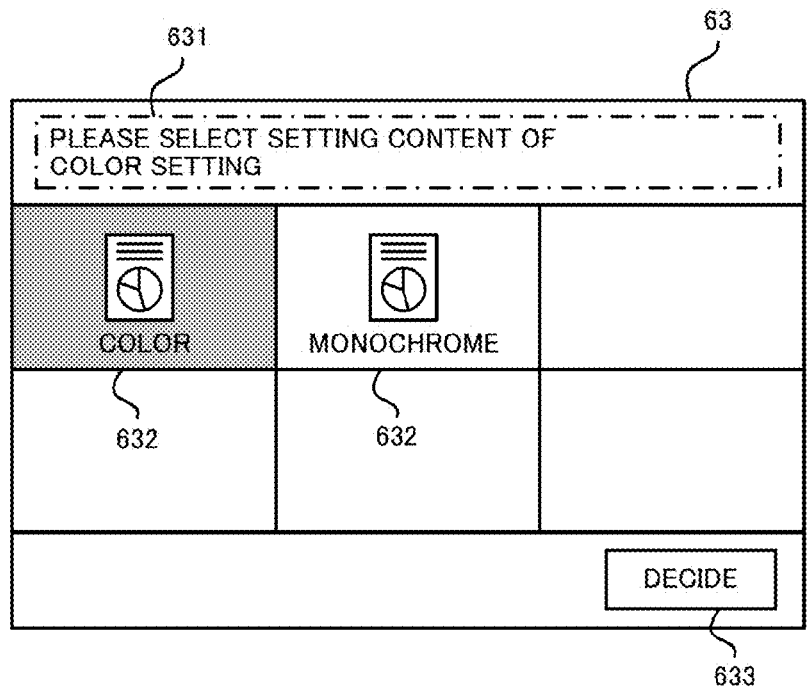
FIGS. 7A and 7B are diagrams showing an example of a setting screen displayed in a wizard format on the multifunction peripheral shown in FIG. 1.

Here, FIG. 7A shows an example of the setting screen 63 displayed in the wizard format. On the setting screen 63 shown in FIG. 7A, a message field 631, setting content selection keys 632, and a decision key 633 are displayed. Various messages to the user are displayed in the message field 631. In each setting content selection key 632, a setting content that is selectable by the user is displayed. When any one of the setting content selection keys 632 is operated, the setting screen 63 comes into a state where the setting content corresponding to the operated setting content selection key 632 has been selected. It should be noted that the sequential display portion 56 displays a state where the setting content of the second setting item registered in the pre-registration information has been selected, as an initial state on the setting screen 63. Then, when the decision key 633 is operated in the state where the setting content has been selected, the sequential display portion 56 switches the setting screen 63 displayed on the operation display portion 6, to the setting screen 63 for setting the setting content of the next second setting item. Here, the selection of the setting content on the setting screen 63 and the operation of the decision key 633 are an example of the setting operation.

Figure 7B:
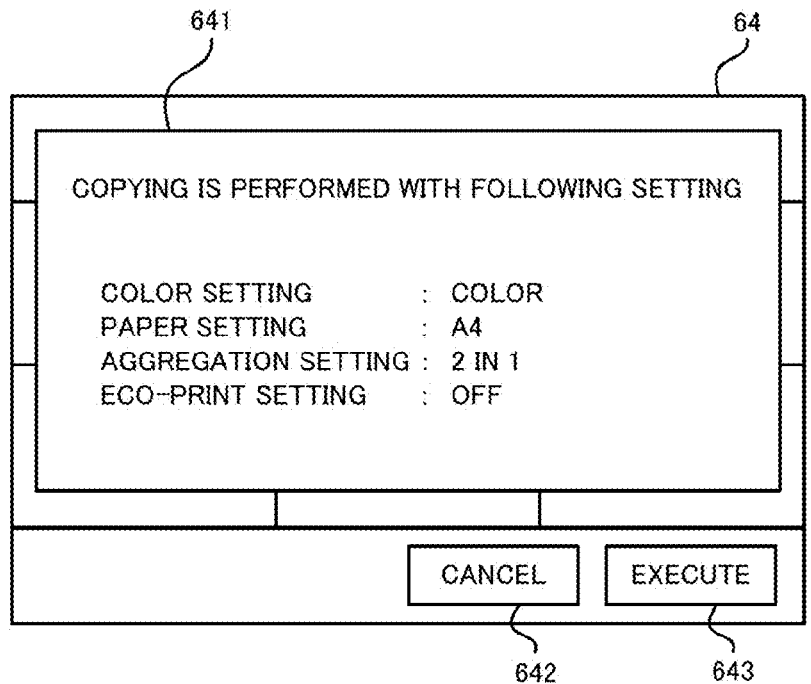

In addition, when displaying of the setting screens 63 for setting all the second setting items registered in the pre-registration information has ended, the sequential display portion 56 displays a setting content confirmation screen 64 shown in FIG. 7B on the operation display portion 6. On the setting content confirmation screen 64 shown in FIG. 7B, a setting content confirmation field 641, a cancel key 642, and an execution key 643 are displayed. In the setting content confirmation field 641, the setting content of each setting item of the job that has been set by using the workflow function is displayed. Then, when the execution key 643 is operated on the setting content confirmation screen 64 by the user, the control portion 5 performs an execution process of executing the job on the basis of the execution conditions displayed in the setting content confirmation field 641.

The second display control portion 57 displays the authentication screen 61 if the setting content of the second setting item on the setting screen 63 is set so as to be outside the range of the use authority. Specifically, the second display control portion 57 determines whether a setting content selected as the setting content of the second setting item is outside the range of the use authority, on the basis of the use authority specified by the authority specification portion 53. In other words, in the case where each setting item of the job is set by using the workflow function, even if the setting content of the second setting item registered in the pre-registration information is outside the range of the use authority, when the setting content of the second setting item is changed to a content within the range of the use authority through the setting screen 63 displayed in the wizard format, the authentication screen 61 is not displayed.

[Job Setting Process]

Figure 8:
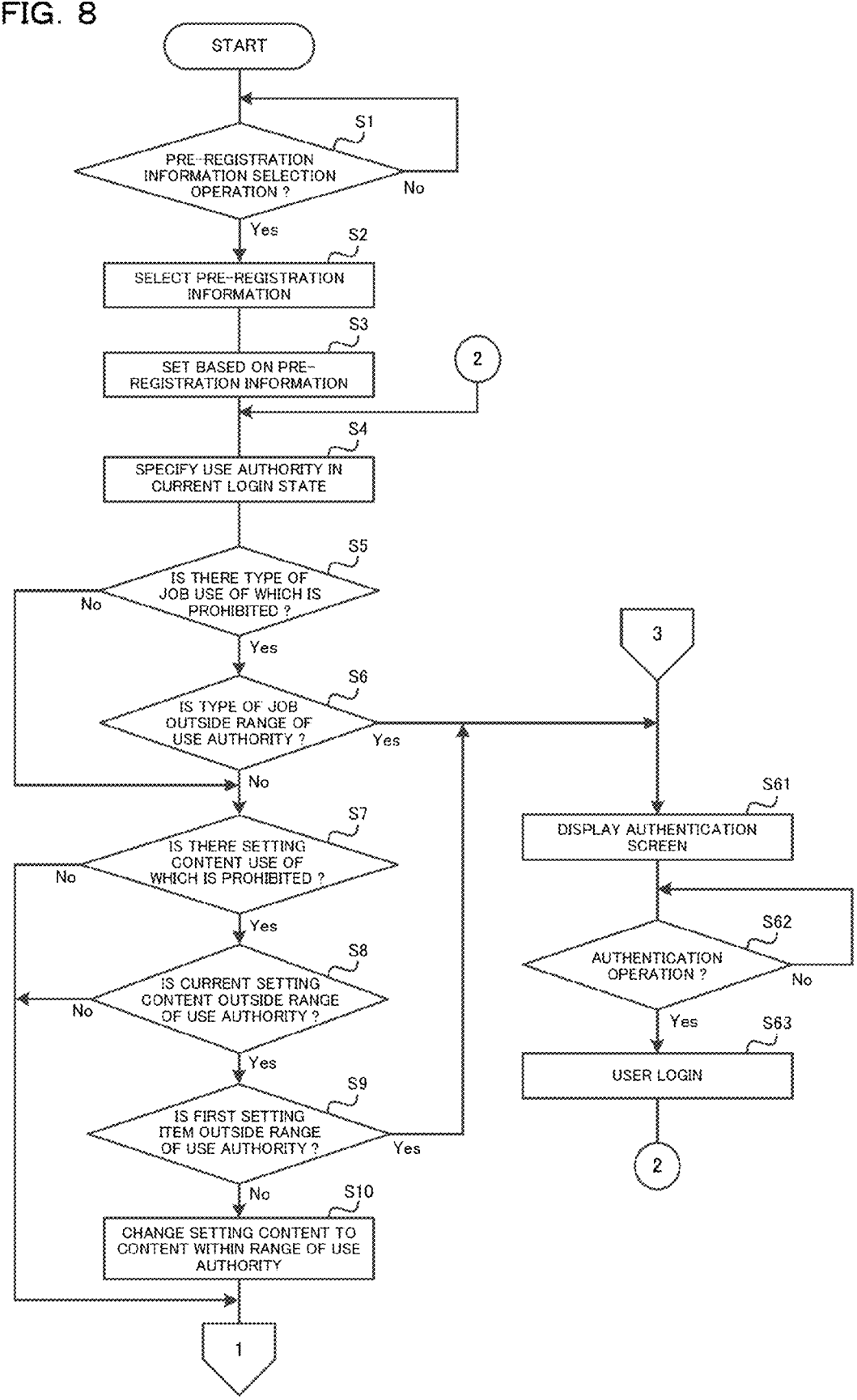
FIG. 8 is a flowchart showing an example of a job setting process executed in the multifunction peripheral shown in FIG. 1.
Figure 9:
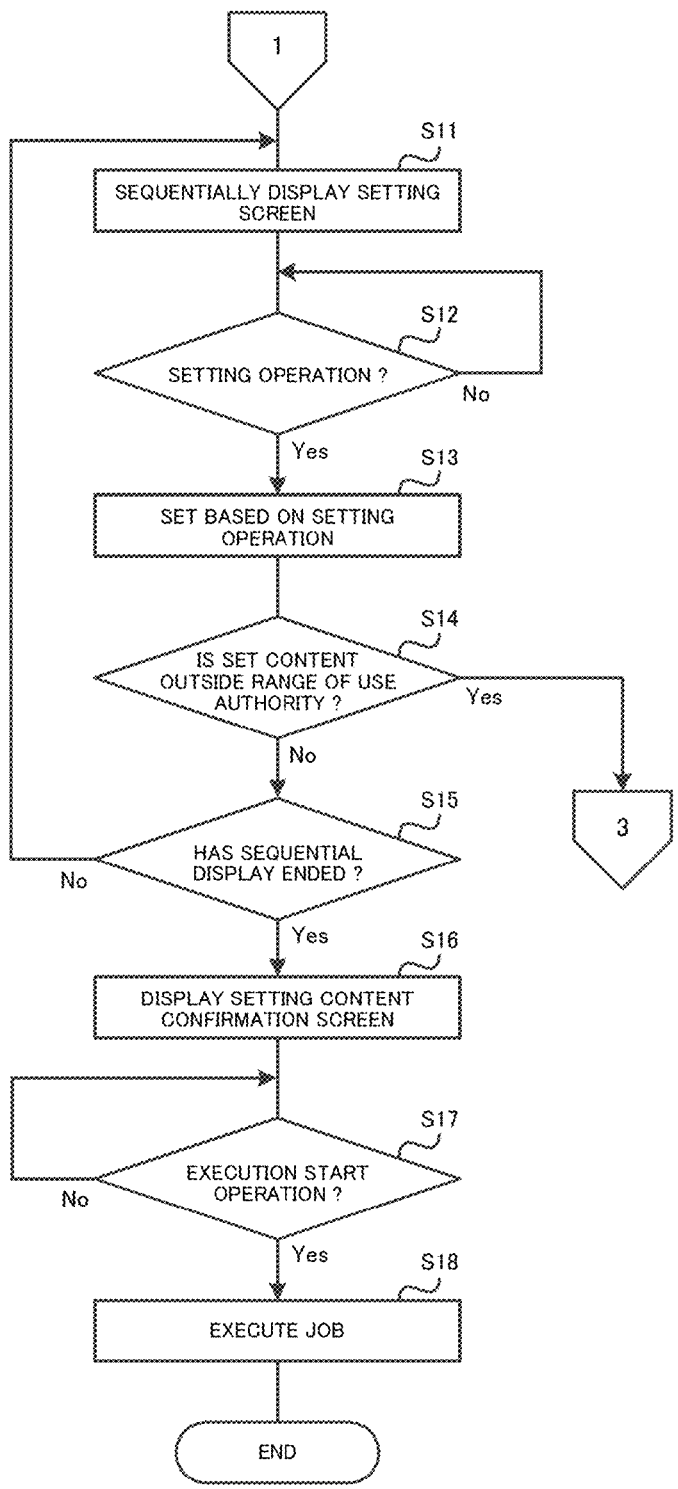
FIG. 9 is a flowchart showing the example of the job setting process executed in the multifunction peripheral shown in FIG. 1.

Hereinafter, an example of a procedure of a job setting process executed by the control portion 5 in the multifunction peripheral 10 will be described with reference to FIGS. 8 and 9. Steps S1, S2, . . . represent numbers of process procedures (steps) executed by the control portion 5. A method including each process procedure of the job setting process executed by the control portion 5 is an example of a job setting method according to the present disclosure. When an operation input of using the workflow function is performed with respect to the operation display portion 6 by the user, the control portion 5 displays the workflow selection screen 62 on the operation display portion 6 and executes the job setting process.

<Step S1>

First, in step S1, the control portion 5 determines whether the selection operation with respect to the pre-registration information displayed on the workflow selection screen 62 has been performed.

Here, if the control portion 5 determines that the selection operation has been performed (Yes in S1), the control portion 5 advances the processing to step S2. In addition, if the selection operation has not been performed (No in S1), the control portion 5 waits for the selection operation in step S1.

<Step S2>

In step S2, the control portion 5 selects any of the pre-registration information stored in the pre-registration information storage portion 82, in accordance with the selection operation in step S1, and reads out the selected pre-registration information from the pre-registration information storage portion 82. Here, the process in step S2 is an example of a second step and is executed by the selection portion 52 of the control portion 5.

<Step S3>

In step S3, the control portion 5 sets the pre-registration information read out in step S2, as a type of a job to be executed and a setting content of each setting item regarding the job, using the workflow function by expanding the pre-registration information into the RAM of the control portion 5.

<Step S4>

In step S4, the control portion 5 reads out the use authority information corresponding to a user who is in a non-login state or has logged in, from the use authority information storage portion 83, and specifies use authority corresponding to the current login state. Here, the process in step S4 is an example of a third step and is executed by the authority specification portion 53 of the control portion 5.

<Step S5>

In step S5, the control portion 5 determines presence/absence of a type of a job use of which is prohibited in the current login state, on the basis of the job authority information D20 included in the use authority information read out in step S4.

Here, if the control portion 5 determines that there is a type of a job use of which is prohibited in the current login state (Yes in S5), the control portion 5 advances the processing to step S6. In addition, if the control portion 5 determines that there is no type of a job use of which is prohibited (No in S5), the control portion 5 advances the processing to step S7.

<Step S6>

In step S6, the control portion 5 determines whether the type of the job in the pre-registration information read out in step S2 is outside the range of the use authority specified in step S4. Specifically, the control portion 5 determines whether the type of the job is outside the range of the use authority, by determining whether the type of the job corresponds to the type of the job use of which is prohibited in the current login state, on the basis of the job authority information D20 included in the use authority information read out in step S4.

Here, if the control portion 5 determines that the type of the job in the pre-registration information is outside the range of the use authority (Yes in S6), the control portion 5 advances the processing to step S61. In addition, if the control portion 5 determines that the type of the job in the pre-registration information is not outside the range of the use authority (No in S6), the control portion 5 advances the processing to step S7.

<Step S61>

In step S61, the control portion 5 displays the authentication screen 61 on the operation display portion 6. It is also conceivable that together with the authentication screen 61, the control portion 5 displays on the operation display portion 6 that a login operation is required since use of the type of the job or the current setting content of the setting item is prohibited in the current login state.

<Step S62>

In step S62, the control portion 5 determines whether the authentication operation has been performed by the user with respect to the authentication screen 61 displayed on the operation display portion 6.

Here, if the control portion 5 determines that the authentication operation has been performed (Yes in S62), the control portion 5 advances the processing to step S63. In addition, if the authentication operation has not been performed (No in S62), the control portion 5 waits for the authentication operation in step S62. It should be noted that if the cancel key 614 is operated on the authentication screen 61, the control portion 5 returns the display screen of the operation display portion 6 to the workflow selection screen 62, the setting screen 63, or the like which is prior to displaying the authentication screen 61. In addition, it is also conceivable that if the cancel key 614 is operated on the authentication screen 61, the control portion 5 performs a process of initializing the setting of the job performed in step S3 and then advances the processing to step S1.

<Step S63>

In step S63, the control portion 5 executes the authentication process for the user in accordance with the authentication operation performed in step S62, and causes the user to log in if an authentication result is a match (an example of a first step). Thereafter, the control portion 5 advances the processing to step S4. Here, the processes in steps S62 and 63 are executed by the authentication control portion 51. If the authentication result is a mismatch, the control portion 5 returns the processing to step S62.

<Step S7>

In step S7, the control portion 5 determines presence/absence of a setting content use of which is prohibited in the current login state, for the type of the job in the pre-registration information read out in step S2, on the basis of the setting authority information D30 included in the use authority information read out in step S4.

Here, if the control portion 5 determines that there is a setting content use of which is prohibited (Yes in S7), the control portion 5 advances the processing to step S8. In addition, if the control portion 5 determines that there is no setting content use of which is prohibited (No in S7), the control portion 6 advances the processing to step S11.

<Step S8>

In step S8, the control portion 5 determines whether the current setting content regarding the type of the job in the pre-registration information read out in step S2 is outside the range of the use authority specified in step S4. Specifically, the control portion 5 determines whether the current setting content is outside the range of the use authority, by determining whether the current setting content of each setting item regarding the type of the job corresponds to a setting content use of which is prohibited in the current login state, on the basis of the setting authority information D30 included in the use authority information read out in step S4.

Here, if the control portion 5 determines that the current setting content of each setting item regarding the type of the job is outside the range of the use authority (Yes in S8), the control portion 5 advances the processing to step S9. In addition, if the control portion 5 determines that the current setting content of each setting item is not outside the range of the use authority (No in S8), the control portion 5 advances the processing to step S11.

<Step S9>

In step S9, the control portion 5 determines whether the setting item whose current setting content has been determined as being outside the range of the use authority in step S8 is the first setting item. It should be noted that if it is determined in step S8 that use of a plurality of setting contents of the current setting contents of the respective setting items is prohibited, it is determined in step S9 for each of the setting contents whether the setting item is the first setting item. Here, the process in step S9 is executed by the first display control portion 54.

Here, if the control portion 5 determines that the setting item whose current setting content has been determined as being outside the range of the use authority in step S8 is the first setting item (Yes in S9), the control portion 5 advances the processing to step S61. In other words, the first display control portion 54 displays the authentication screen 61 if the setting content of the first setting item of the plurality of the setting items included in the pre-registration information is outside the range of the use authority (an example of a fourth step). In addition, if the control portion 5 determines that the setting item whose current setting content has been determined as being outside the range of the use authority in step S8 is not the first setting item (No in S9), the control portion 5 advances the processing to step S10.

<Step S10>

In step S10, the control portion 5 changes the setting content of the setting item whose current setting content has been determined as being outside the range of the use authority in step S8, to a setting content within the range of the use authority in the current login state. Specifically, the control portion 5 changes the setting content by rewriting the setting content of the setting item stored in the RAM of the control portion 5, on the basis of the setting authority information D30 included in the use authority information read out in step S4. Then, the control portion 5 advances the processing to step S11. Here, the process in step S10 is an example of a fifth step and is executed by the change portion 55. It should be noted that if a plurality of setting contents within the range of the use authority are present for the setting item, for example, a setting content that is present as a standard setting is selected from among the plurality of setting contents. In addition, it is also conceivable that a setting content that has the highest priority among priorities preset for the plurality of setting contents and is within the range of the use authority is selected.

<Step S11>

In step S11, the control portion 5 sequentially displays, on the operation display portion 6, the setting screen 63 for each second setting item included in the pre-registration information read out in step S2, in accordance with setting operations on the setting screen 63. Specifically, the control portion 5 sequentially displays the setting screen 63 for each second setting item in the pre-registration information stored in the RAM of the control portion 5, in the wizard format. Here, the process in step S11 is an example of a sixth step and is executed by the sequential display portion 56 of the control portion 5.

<Step S12>

In step S12, the control portion 5 determines whether a setting operation has been performed by the user on the setting screen 63 displayed in step S11.

Here, if the control portion 5 determines that the setting operation has been performed (Yes in S12), the control portion 5 advances the processing to step S13. In addition, if the setting operation has not been performed (No in S12), the control portion 5 waits for the setting operation in step S12.

<Step S13>

In step S13, the control portion 5 sets the setting content of the second setting item on the basis of the setting operation performed in step S12. Specifically, the control portion 5 stores the setting content of the second setting item selected by the setting operation, in the RAM of the control portion 5.

<Step S14>

In step S14, the control portion 5 determines whether the setting content of the second setting item that has been set in step S13 is outside the range of the use authority specified in step S4. Specifically, the control portion 5 determines whether the setting content is outside the range of the use authority, by determining whether the setting content of the second setting item corresponds to a setting content use of which is prohibited in the current login state, on the basis of the setting authority information D30 included in the use authority information read out in step S4. Here, the process in step S14 is executed by the second display control portion 57 of the control portion 5.

Here, if the control portion 5 determines that the setting content of the second setting item is outside the range of the use authority (Yes in S14), the control portion 5 advances the processing to step S61. In other words, the second display control portion 57 displays the authentication screen 61 if the setting content of the second setting item is set on the setting screen 63 so as to be outside the range of the use authority (an example of a seventh step). In addition, if the control portion 5 determines that the setting content of the second setting item is not outside the range of the use authority (No in S14), the control portion 5 advances the processing to step S15.

It should be noted that in the case where the control portion 5 advances the processing from step S14 to step S61, the control portion 5 may cancel the setting of the job in step S13 in accordance with an operation of the user on the operation display portion 6. For example, it is conceivable that when the authentication screen 61 is displayed in step S61, the control portion 5 cancels the setting of the job in step S13 in accordance with an operation of the cancel key 614 by the user and advances the processing to step S12.

In addition, in the present embodiment, in the case where the control portion 5 advances the processing from step S14 to step S61, when the control portion 5 performs the process in step S11 after login of the user, the control portion 5 performs sequential displaying of the setting screens 63 for the second setting items registered in the pre-registration information, again from the beginning. In other words, if the setting contents of the second setting items set in step S13 before the login include a setting content use of which is prohibited for the user after the login, the setting content is changed in step S10, and the setting screen 63 is redisplayed in step S11. Thus, even if the setting content of the second setting item set before the login violates the use authority of the user after the login, the user is allowed to continue a setting operation of setting the setting content of each setting item of the job by using the workflow function.

<Step S15>

In step S15, the control portion 5 determines whether the setting screens 63 for all the second setting items registered in the pre-registration information read out in step S2 have been displayed in step S11. In other words, the control portion 5 determines whether the setting operation for each second setting item has ended. For example, the control portion 5 sequentially displays the second setting items stored in the RAM, and if there is no second setting item for which the setting screen 63 is to be displayed, the control portion 5 determines that the setting screens 63 for all the second setting items have been displayed.

Here, if the control portion 5 determines that the setting screens 63 for all the second setting items have been displayed (Yes in S15), the control portion 5 advances the processing to step S16. In addition, if the control portion 5 determines that not all the setting screens 63 for the second setting items have been displayed (No in S15), the control portion 5 advances the processing to step S11 and switches the setting screen 63 to the setting screen 63 corresponding to the setting content of the next second setting item.

<Step S16>

In step S16, the control portion 5 displays the setting content confirmation screen 64 on the operation display portion 6. Specifically, on the basis of the setting content of each setting item stored in the RAM, the control portion 5 displays the type of the job and the setting content of each setting item in the setting content confirmation field 641 of the setting content confirmation screen 64.

<Step S17>

In step S17, the control portion 5 determines whether an execution start operation for the job has been performed. Specifically, the control portion 5 determines whether a user operation of the execution key 643 has been performed with respect to the setting content confirmation screen 64 displayed in step S16.

Here, if the control portion 5 determines that the execution start operation has been performed (Yes in S17), the control portion 5 advances the processing to step S18. In addition, if the execution start operation has not been performed (No in S17), the control portion 5 waits for the execution start operation in step S17. It is also conceivable that if the cancel key 642 is operated on the setting content confirmation screen 64, the control portion 5 gives an opportunity for setting each setting item again to the user by executing the sequential display process in and after step S11 again. In addition, it is also conceivable that if the cancel key 642 is operated on the setting content confirmation screen 64, the control portion 5 initializes the setting contents of the job set in steps S3 and S13 and advances the processing to step S1.

<Step S18>

In step S18, the control portion 5 executes the job corresponding to the type of the job indicated by the pre-registration information read out in step S2, in accordance with the setting contents of the job set in steps S3 and S13. In other words, the control portion 5 uses the setting content stored in the pre-registration information, for each first setting item in the pre-registration information, uses the setting content stored in the pre-registration information or the setting content that is after the change by the setting operation on the setting screen 63, for each second setting item, and executes the job.

As described above, in the job setting process executed in the multifunction peripheral 10, if the first setting item whose setting content is prohibited is included in the read-out pre-registration information, the authentication screen 61 is displayed at the time when the pre-registration information is read out. Meanwhile, if the second setting item whose setting content is prohibited is included in the read-out pre-registration information, the authentication screen 61 is not displayed at the time when the pre-registration information is read out. Then, in this case, the setting content of the second setting item use of which is prohibited is automatically changed to a setting content that is not prohibited, and the setting screen 63 is displayed in the wizard format in a state where the setting content after the change has been selected. Thus, in the multifunction peripheral 10, it is possible to eliminate the need for a wasted login operation of the user in setting a content of each setting item regarding a job by using the workflow function.

In the present embodiment, the case where the authentication control portion 51 executes the authentication process on the basis of the authentication information stored in the authentication information storage portion 81 has been described as an example. Meanwhile, it is also conceivable that the authentication process is executed by an authentication sever connected to the multifunction peripheral 10 via the communication network in a communicable manner. In this case, the authentication sever includes a storage portion in which the authentication information has been stored. The authentication control portion 51 transmits the login information inputted on the authentication screen 61, to the authentication sever. Meanwhile, the authentication sever determines whether the login information received from the multifunction peripheral 10 is included in the authentication information stored in the storage portion, and transmits the determination result to the multifunction peripheral 10. Thus, the authentication control portion 51 is able to determine whether the user has logged in, on the basis of the determination result received from the authentication sever. It is also conceivable that the authentication sever includes the use authority information storage portion 83 and transmits the use authority information of the user corresponding to the authentication information together with the determination result to the multifunction peripheral 10.

In addition, in the present embodiment, the case where the job setting process is executed in the multifunction peripheral 10 has been described as an example. Meanwhile, it is also conceivable as another embodiment that the job setting process is executed by an information processing apparatus such as a personal computer that is connected in a communicable manner to an image processing apparatus such as a printer, a copying machine, a facsimile apparatus, a scanner, or a multifunction peripheral. In this case, a printer driver for controlling the image processing apparatus is installed in the information processing apparatus such as a personal computer. Then, a control portion such as a CPU mounted in the information processing apparatus executes the job setting process in accordance with the printer driver.

[Screen Transition in Job Setting Process]

Hereinafter, an example of screen transition when the job setting process is executed in the multifunction peripheral 10 will be described with reference to FIGS. 10A to 10D. Here, as an example, the case will be described in which the default user shown in the use authority information in FIGS. 4A and 4B performs an operation input for requesting execution of a job with respect to the operation display portion 6 by using the workflow function.

Figure 10A:
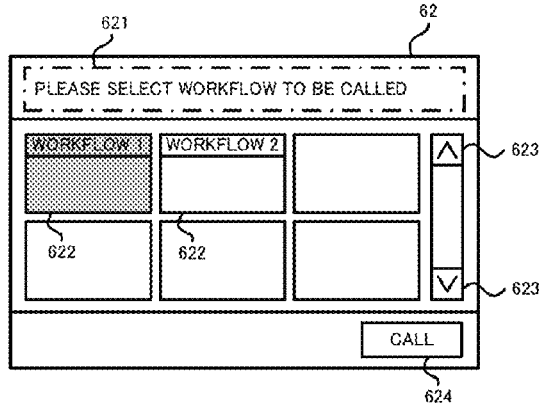
FIGS. 10A to 10D are diagrams showing an example of screen transition in the job setting process executed in the multifunction peripheral shown in FIG. 1.

First, as shown in FIG. 10A, the workflow selection screen 62 is displayed on the operation display portion 6. On the workflow selection screen 62 shown in FIG. 10A, the names "workflow 1" and "workflow 2" corresponding to the pre-registration information D10 and D11 shown in FIGS. 3A and 3B are displayed in the respective workflow selection keys 622. Here, the description will be continued with the case where the workflow selection key 622 in which "workflow 1" corresponding to the pre-registration information D10 is displayed is selected by the default user and the call key 624 is operated by the user.

Figure 10D:
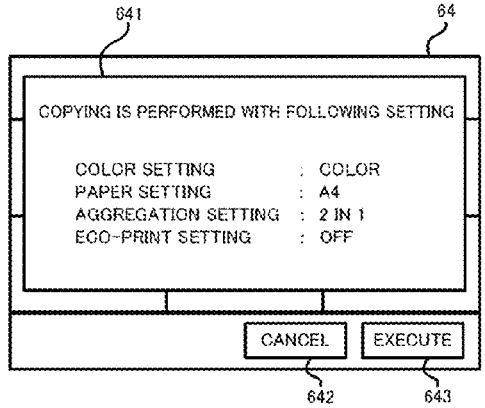
Figure 10B:
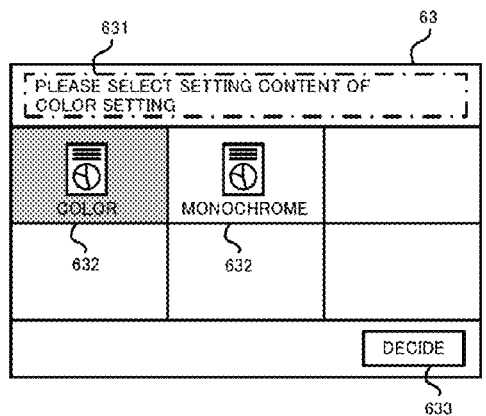

When the call key 624 is operated by the default user, the setting screen 63 for the color setting which is the second setting item registered in the selected pre-registration information D10 is displayed on the operation display portion 6 as shown in FIG. 10B. Here, in the pre-registration information D10, the setting content "color" is pre-registered for the color setting. Thus, the setting screen 63 is displayed in a state where the setting content selection key 632 in which the setting content "color" registered in the pre-registration information D10 is displayed has been selected. Here, the description will be continued with the case where the decision key 633 is operated by the default user in the state where the setting content "color" has been selected.

Figure 10C:
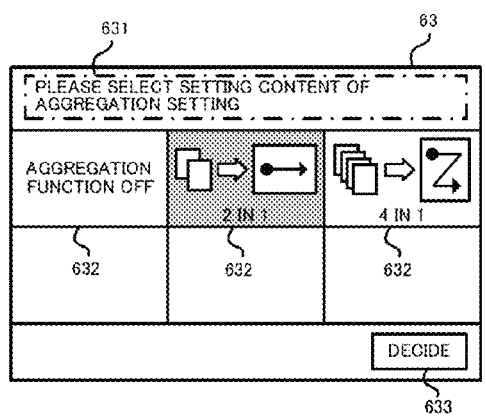

When the decision key 633 is operated by the default user, the setting screen 63 for the aggregation setting which is the next second setting item registered in the selected pre-registration information D10 is displayed on the operation display portion 6 as shown in FIG. 10C. Here, in the pre-registration information D10, the setting content "OFF" is pre-registered for the aggregation setting. However, in the setting authority information D30, the setting of "OFF" of the aggregation setting by the default user is prohibited and is outside the range of the use authority. Thus, the setting content of the aggregation setting in the pre-registration information D10 is changed by the control portion 5 to "2 IN 1" which is a setting content within the range of the use authority of the default user. Accordingly, the setting screen 63 is displayed in a state where "2 IN 1" which is the setting content changed by the control portion 5 has been selected. Here, the description will be continued with the case where the decision key 633 is operated by the default user in the state where the setting content "2 IN 1" has been selected.

Then, when the decision key 633 is operated by the default user, the setting content confirmation screen 64 is displayed on the operation display portion 6 as shown in FIG. 10D. Here, when the execution key 643 is operated by the default user, the copy process is executed by the control portion 5 in accordance with the setting contents displayed in the setting content confirmation field 641.

[Other Embodiments]

Figure 11:
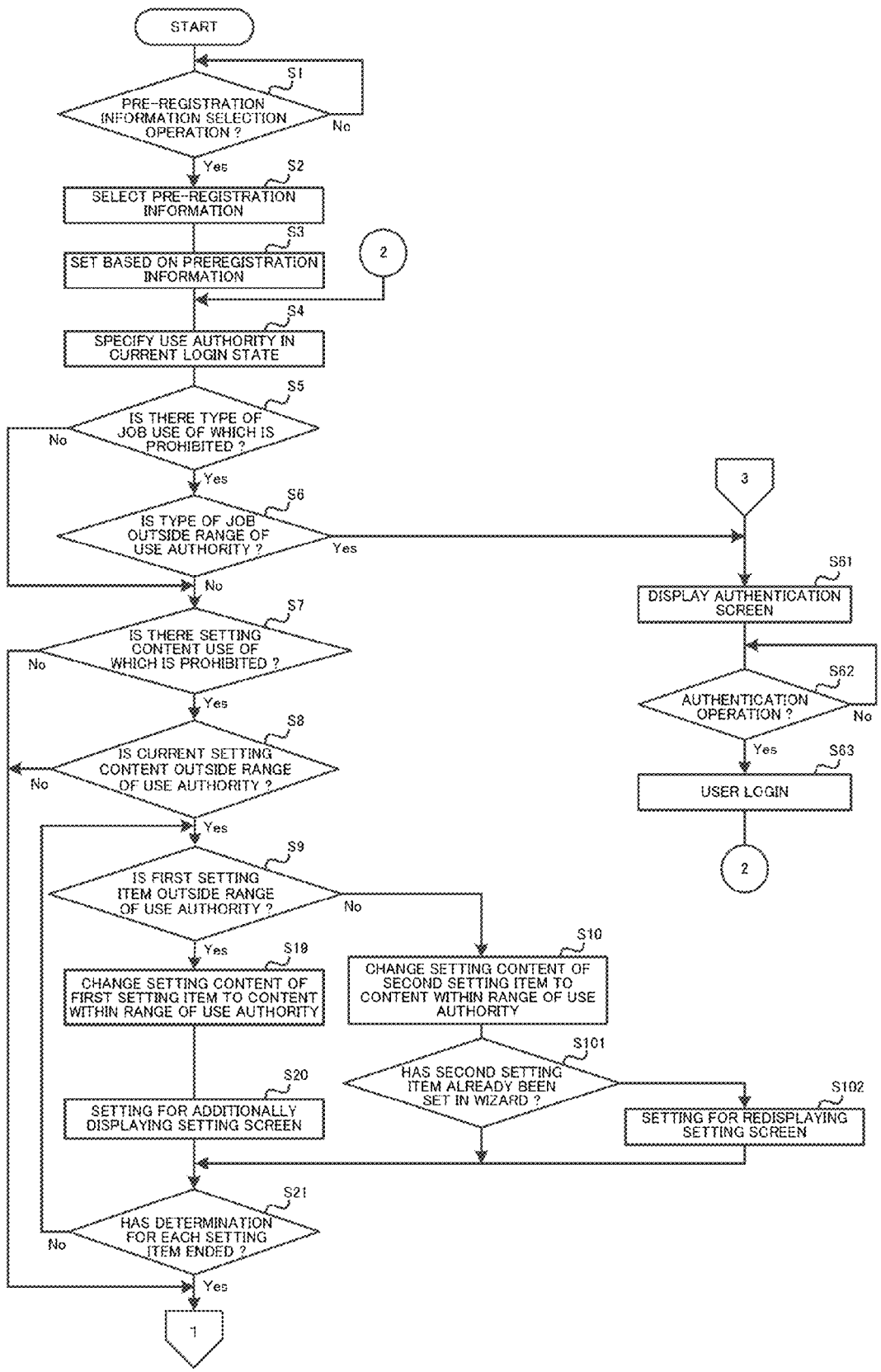
FIG. 11 is a flowchart showing another example of the job setting process executed in the multifunction peripheral shown in FIG. 1.

Hereinafter, another example of the job setting process executed by the control portion 5 in the multifunction peripheral 10 will be described with reference to FIG. 11. Specifically, in the multifunction peripheral 10 according to another embodiment described below, the job setting process shown in FIG. 8 is executed in a non-login state, and the job setting process shown in FIG. 11 is executed in a login state of a user for whom the authentication information has been stored. It should be noted that immediately after login of the user for whom the authentication information has been stored (step S63), the process is executed from step S4 in FIG. 11. Here, of the process procedures shown in FIG. 11, the same process procedures as those in the job setting process shown in FIG. 8 are designated by the same reference signs and the description thereof is omitted. Specifically, in the job setting process shown in FIG. 11, the processes in and after step S9 are different from those in FIG. 8.

<Step S9>

In step S9, if the control portion 5 determines that the setting item whose current setting content has been determined as being outside the range of the use authority in step S8 is the first setting item (Yes in S9), the control portion 5 advances the processing to step S19. In addition, if the control portion 5 determines that the setting item whose current setting content has been determined as being outside the range of the use authority in step S8 is not the first setting item (No in S9), the control portion 5 advances the processing to step S10.

<Step S19>

In step S19, the control portion 5 changes the setting content of the first setting item whose current setting content has been determined as being outside the range of the use authority in step S8, to a setting content within the range of the use authority in the current login state. Here, the process in step S19 is executed by the change portion 55 of the control portion 5.

As described above, in the job setting process according to the other embodiment, if the setting content of the first setting item is outside the range of the use authority corresponding to the user after login, the setting content of the first setting item is changed to a content within the range of the use authority of the user by the change portion 55, instead of displaying of the authentication screen 61 by the first display control portion 54. Thus, the first display control portion 54 displays the authentication screen 61 only in the non-login state and if the setting content of the first setting item is outside the range of the use authority corresponding to the non-login state (Yes in S9 in FIG. 8).

<Step S20>

In step S20, the control portion 5 performs setting for adding the first setting item whose setting content has been changed in step S19, as an object to be displayed in the wizard format in step S11. Specifically, the control portion 5 changes information on whether the first setting item whose setting content has been changed in step S19 is to be displayed in the wizard format, of the pre-registration information expanded into the RAM. Here, the process in step S20 is executed by the sequential display portion 56. Accordingly, in step S11 shown in FIG. 9, the first setting item whose setting content has been changed in step S19 is displayed in the wizard format. Therefore, the user can recognize that the content of the first setting item has been changed, through the display in the wizard format.

<Step S21>

In step S21, the control portion 5 determines whether the determination has ended as to whether each setting item whose current setting content has been determined as being outside the range of the use authority in step S8 is the first setting item.

Here, if the control portion 5 determines that the determination has ended as to whether each setting item whose current setting content has been determined as being outside the range of the use authority is the first setting item (Yes in S21), the control portion 5 advances the processing to step S11. In addition, if the control portion 5 determines that the determination has not ended as to whether each setting item whose current setting content has been determined as being outside the range of the use authority is the first setting item (No in S21), the control portion 5 returns the processing to step S9. In other words, if a plurality of the setting items whose current setting contents have been determined as being outside the range of the use authority in step S8 are present, the processes in and after step S9 are executed for each of the setting items.

<Step S10>

On the other hand, if it is determined in step S9 that the setting item whose current setting content has been determined as being outside the range of the use authority in step S8 is not the first setting item, the control portion 5 executes a process in step S10. In step S10, as described above, the setting content of the second setting item whose current setting content has been determined as being outside the range of the use authority in step S8 is changed to a setting content within the range of the use authority in the current login state.

<Step S101>

Next, in step S101, the control portion 5 determines whether the second setting item whose setting content has been changed in step S10 has already been set on the setting screen 63 displayed in the wizard format in step S11.

For example, it is conceivable that when each second setting item is set on the setting screen 63 in step S13, the control portion 5 stores the setting as setting history information in the RAM. Thus, the control portion 5 is able to determine in step S101 whether the second setting item whose setting content has been changed in step S10 has already been set on the setting screen 63, on the basis of the setting history information.

Here, if the control portion 5 determines that the second setting item whose setting content has been changed has already been set on the setting screen 63 (Yes in S101), the control portion 5 advances the processing to step S102. In addition, if the control portion 5 determines that the second setting item whose setting content has been changed has not already been set on the setting screen 63 (No in S101), the control portion 5 advances the processing to step S21.

<Step S102>

In step S102, the control portion 5 performs setting for redisplaying, in step S11, the setting screen 63 corresponding to the second setting item whose setting content has been changed in step S10 and which has already been set on the setting screen 63. Specifically, it is conceivable that in the configuration in which the setting history information is stored in the RAM as described above, the control portion 5 changes information, in the setting history information, of the second setting item that is an object to be redisplayed, to an unset state. It should be noted that the control portion 5 does not perform the setting of redisplay for the second setting item which has already been set on the setting screen 63 and whose setting content has not been changed in step S10. Thus, in step S11, the setting screen 63 corresponding to only the second setting item which has already been set on the setting screen 63 before login of the user and whose setting content has been changed in step S10 after the login is redisplayed. Here, the process in step S102 is executed by the sequential display portion 56.

As described above, in the job setting process according to the other embodiment, after the setting content of the second setting item whose setting content set before login is a setting content use of which is prohibited for the user after the login is changed to a content within the range of the use authority of the current user, the setting screen 63 corresponding to the second setting item is redisplayed. Thus, it is possible to make the user recognize that the content of the already set second setting item has been changed. In addition, in the job setting process according to the other embodiment, the setting screen 63 is not redisplayed for the second setting item that is the already set second setting item but is still within the range of the use authority after login. Thus, time and effort for an operation of the user when the user logs in in the course of the setting operation of setting the job by using the wizard function are reduced. As a matter of course, it is also conceivable that the setting screens 63 corresponding to all the second setting items are redisplayed after login.

In addition, in the job setting process according to the other embodiment, if the setting content of the first setting item included in the pre-registration information is a setting content use of which is prohibited for the user after login, the setting screen 63 corresponding to the first setting item is additionally displayed in the wizard format. Thus, in the job setting process according to the other embodiment, when the user logs in in the course of the setting operation of setting the job by using the wizard function, it is possible to prevent the setting operation performed before the login from being wasted due to the fact that the setting content of the first setting item is outside the range of the use authority.

[Screen Transition in Job Setting Process According to Another Embodiment]

Figure 12A:
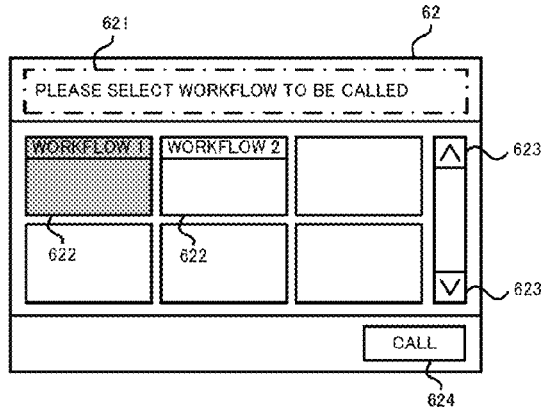
FIGS. 12A to 12F are diagrams showing another example of the screen transition in the job setting process executed in the multifunction peripheral shown in FIG. 1.
Figure 12B:
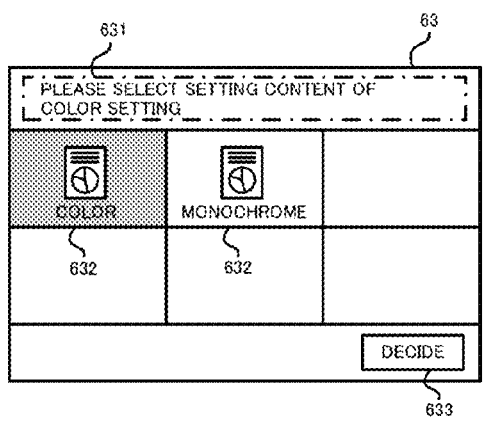

Hereinafter, an example of screen transition when the job setting process according to the other embodiment is executed will be described with reference to FIGS. 12A to 12F and 13A to 13F. It should be noted that FIG. 12A and FIG. 13A are the same as FIG. 10A, FIG. 12B and FIG. 13B are the same as FIG. 10B, and thus the description thereof is omitted. In addition, FIG. 12F and FIG. 13F are diagrams each showing an example of the setting content confirmation screen 64 displayed after setting in the job setting process, similarly to FIG. 10D.

Figure 12C:
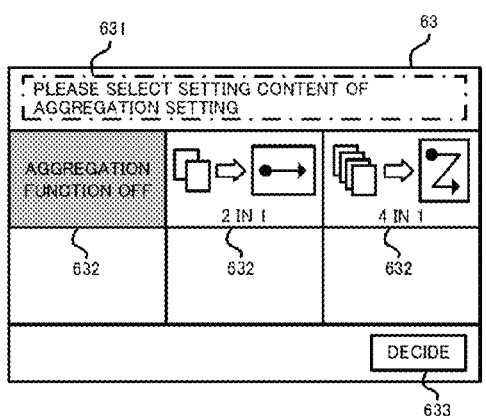
Figure 12D:
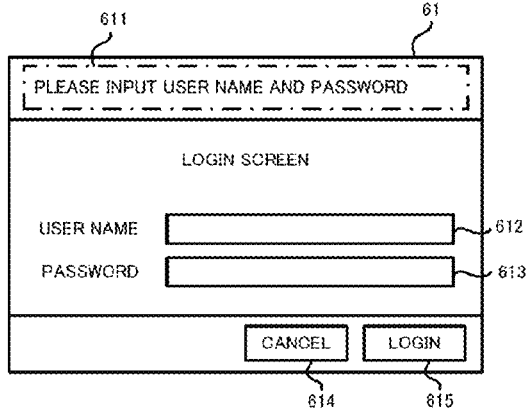
Figure 12E:
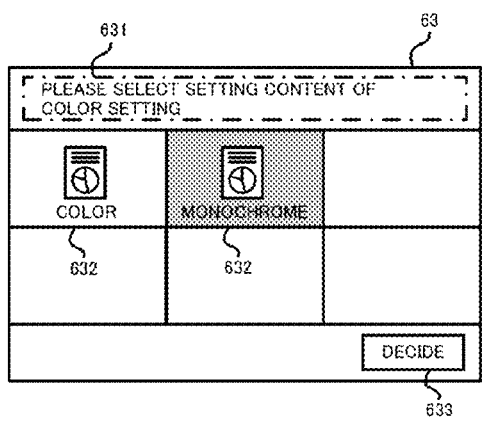
Figure 12F:
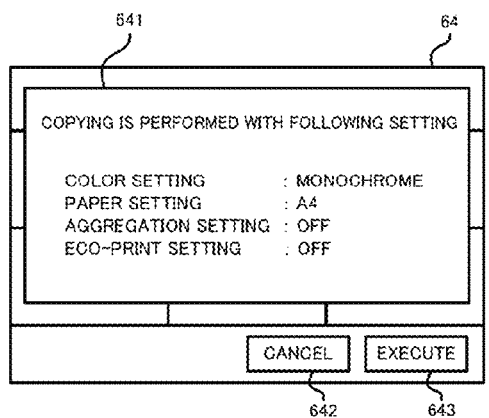
Figure 13A:
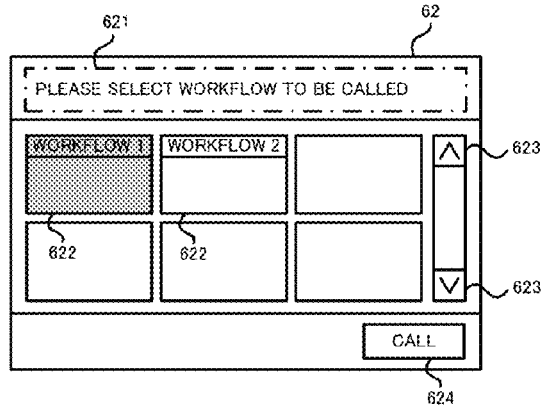
FIGS. 13A to 13F are diagrams showing the other example of the screen transition in the job setting process executed in the multifunction peripheral shown in FIG. 1.
Figure 13B:
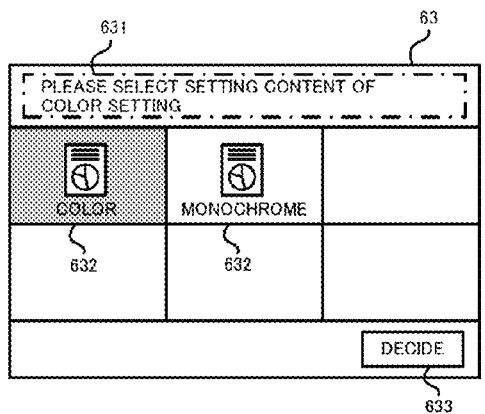
Figure 13C:
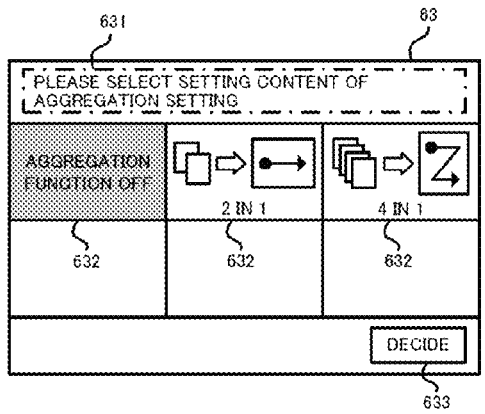
Figure 13D:
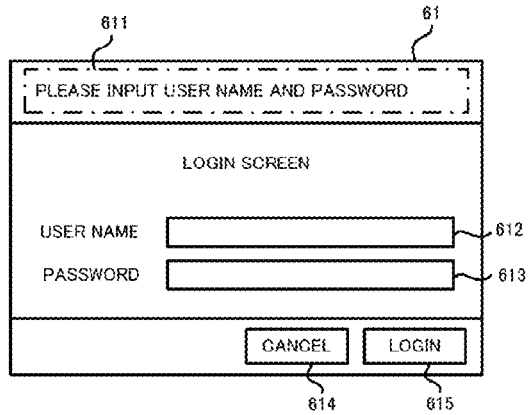

When "OFF" which is a setting content outside the range of the use authority of the default user is selected and the decision key 633 is operated on the setting screen 63 for the aggregation setting that is displayed in the non-login state as shown in FIG. 12C, the authentication screen 61 is displayed as shown in FIG. 12D. Here, when the login information that matches the authentication information is inputted and the login key 615 is operated, the multifunction peripheral 10 transits to a login state of the user corresponding to the login information. If the user who logs in at that time is the user A, since the setting content of each already set second setting item is within the range of the use authority, the setting content confirmation screen 64 is displayed as shown in FIG. 12F.

However, if the user who logs in at that time is the user B, "color" which has already been set in the setting screen 63 shown in FIG. 12B as a setting content of the color setting which is the second setting item is outside the range of the use authority. Thus, the setting content of the color setting is changed by the control portion 5 to "monochrome" which is within the range of the use authority of the user B. Then, as shown in FIG. 12E, the setting screen 63 corresponding to the color setting which is the second setting item that has already been set before the login is redisplayed on the operation display portion 6. Thus, the user B can recognize that the color setting has been automatically changed from "color" which has been set before the login to "monochrome" which is within the range of the use authority, on the basis of the own use authority. It is also conceivable that on the setting screen 63 displayed on the operation display portion 6 at that time, "color" which is a candidate as a setting content of the color setting is displayed in grayout or the like, thereby indicating that "color" is outside the range of the use authority.

Figure 13E:
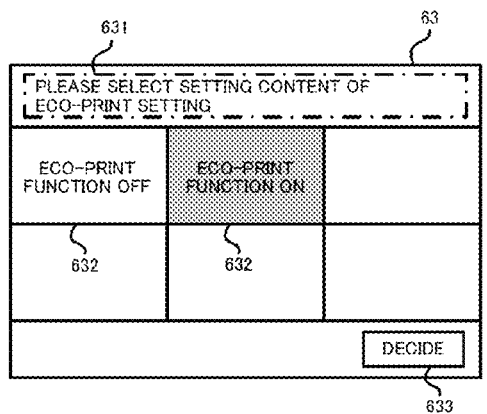
Figure 13F:
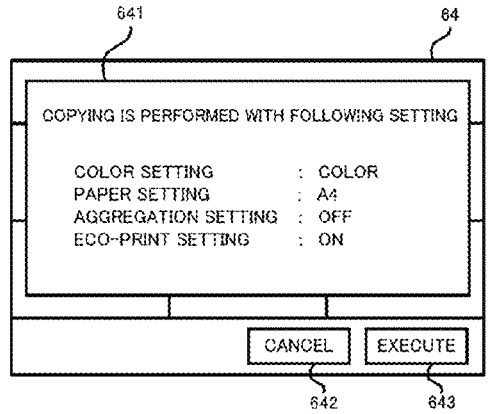

In addition, if the user who logs in at that time is the user C, the setting content "OFF" of the eco-print function which is the first setting item is outside the range of the use authority. Thus, the setting content of the eco-print function is changed by the control portion 5 to "ON" which is within the range of the use authority of the user C. Then, as shown in FIG. 13E, the setting screen 63 corresponding to the eco-print function is displayed on the operation display portion 6. In other words, the setting screen 63 for setting the eco-print function which is the first setting item is added to the setting screens 63 to be displayed in the wizard format. Thus, the user C can recognize that the eco-print function has been automatically changed to "ON" which is within the range of the use authority, on the basis of the own use authority. It is also conceivable that on the setting screen 63 displayed on the operation display portion 6 at that time, "OFF" which is a candidate as a setting content of the eco-print function is displayed in grayout or the like, thereby indicating that "OFF" is outside the range of the use authority.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising a controller which comprises:
   an authentication control portion configured to cause a user to log in in accordance with a preset authentication operation;
   a selection portion configured to select pre-registration information in which a setting content of each setting item regarding a job is pre-registered, in accordance with a preset selection operation;
   an authority specification portion configured to specify use authority that is preset so as to correspond to a non-login state and each user, in accordance with a current login state;
   a first display control portion configured to display an authentication screen for performing the authentication operation, if the setting content of a first setting item which is preset as the setting item not to be displayed in a wizard format among a plurality of the setting items included in the pre-registration information selected by the selection portion is outside a range of the use authority;
   a change portion configured to, if a setting content of a second setting item which is preset as the setting item to be displayed in the wizard format among the setting items included in the pre-registration information selected by the selection portion is outside the range of the use authority, change the setting content of the second setting item to a content within the range of the use authority;
   a sequential display portion configured to sequentially display a setting screen for setting the setting content of the second setting item, in accordance with a setting operation on the setting screen; and
   a second display control portion configured to display the authentication screen if the setting content of the second setting item is set on the setting screen so as to be outside the range of the use authority.

2. The information processing apparatus according to claim 1, wherein the change portion changes the setting content of the second setting item to a content within the range of the use authority if the setting content of the second setting item that has been set before the login of the user by the authentication control portion is outside the range of the use authority corresponding to the user after the login, and after the login, the sequential display portion redisplays the setting screen corresponding to the second setting item that has been set before the login.

3. The information processing apparatus according to claim 2, wherein the sequential display portion redisplays the setting screen corresponding to only the second setting item whose setting content has been changed by the change portion after the login.

4. The information processing apparatus according to claim 1, wherein the first display control portion displays the authentication screen only in the non-login state and if the setting content of the first setting item is outside the range of the use authority corresponding to the non-login state, the change portion changes the setting content of the first setting item to a content within the range of the use authority if the setting content of the first setting item is outside the range of the use authority corresponding to the user after the login, and the sequential display portion displays the setting screen corresponding to the first setting item whose setting content has been changed by the change portion.

5. The information processing apparatus according to claim 1, wherein the job includes an image reading process of reading image data from a document sheet, an image forming process of forming an image on the basis of the image data, or a data transmission process of transmitting the image data.

6. A job setting method implemented by an information processing apparatus, comprising:

a first step of causing a user to log in in accordance with a preset authentication operation;

a second step of selecting pre-registration information in which a setting content of each setting item regarding a job is pre-registered, in accordance with a preset selection operation;

a third step of specifying use authority that is preset so as to correspond to a non-login state and each user, in accordance with a current login state;

a fourth step of displaying an authentication screen for performing the authentication operation, if the setting content of a first setting item which is preset as the setting item not to be displayed in a wizard format among a plurality of the setting items included in the pre-registration information selected in the second step is outside a range of the use authority;

a fifth step of, if a setting content of a second setting item of the plurality which is preset as the setting item to be displayed in the wizard format among the setting items included in the pre-registration information selected in the second step is outside the range of the use authority, changing the setting content of the second setting item to a content within the range of the use authority;

a sixth step of sequentially displaying a setting screen for setting the setting content of the second setting item, in accordance with a setting operation on the setting screen; and a seventh step of displaying the authentication screen if the setting content of the second setting item is set on the setting screen so as to be outside the range of the use authority.

7. The information processing apparatus according to claim 1, wherein the selection portion is further configured to display one or more workflow selection keys that respectively correspond to one or more pieces of the pre-registration information, and when any of the one or more workflow selection keys is operated, the selection portion displays the operated workflow selection key in a color that is different from the color of the other workflow selection keys.

8. The information processing apparatus according to claim 1, wherein on the setting screen, a candidate has the setting content that is outside the range of the use authority is displayed in grayout.

* * * * *